United States Patent [19]
Jung

[11] Patent Number: 5,877,517
[45] Date of Patent: Mar. 2, 1999

[54] THIN FILM ACTUATED MIRROR ARRAY IN AN OPTICAL PROJECTION SYSTEM

[75] Inventor: Sang-Chol Jung, Seoul, Rep. of Korea

[73] Assignee: Daewoo Electronics Co., Ltd., Rep. of Korea

[21] Appl. No.: 885,916

[22] Filed: Jun. 30, 1997

[30] Foreign Application Priority Data

Jun. 28, 1996 [KR] Rep. of Korea ................ 1996-25323

[51] Int. Cl.⁶ .................................................. H01L 33/00
[52] U.S. Cl. ........................ 257/98; 257/99; 257/432; 257/433; 358/60; 358/62; 358/233; 359/291; 359/295; 359/850
[58] Field of Search .................................. 257/432, 433, 257/98, 99; 358/60, 62, 233; 359/846, 224, 291, 295, 872

[56] References Cited

U.S. PATENT DOCUMENTS

| | | | |
|---|---|---|---|
| 5,126,836 | 6/1992 | Um | 358/60 |
| 5,469,302 | 11/1995 | Lim | 359/846 |
| 5,550,680 | 8/1996 | Yoon | 359/850 |
| 5,610,757 | 3/1997 | Ji et al. | 359/295 |
| 5,663,830 | 9/1997 | Ji et al. | 359/295 |
| 5,754,330 | 5/1998 | Nam | 359/291 |
| 5,754,331 | 5/1998 | Min | 359/291 |

FOREIGN PATENT DOCUMENTS

WO 95/13683  5/1995  WIPO .
WO 95/14351  5/1995  WIPO .

*Primary Examiner*—William Mintel
*Attorney, Agent, or Firm*—Pillsbury Madison & Sutro LLP

[57] ABSTRACT

Thin film AMA in an optical projection system and a method for manufacturing the same are disclosed. The thin film AMA has a substrate having an electrical wiring and a connecting terminal, a supporting element formed on the substrate, an actuator formed on the supporting element, and a reflecting member formed on the actuator. The actuator has a maximum length in order to have a large tilting angle, so the reflecting member installed on the actuator has a large tilting angle. Hence, the light efficiency of the light reflected by the reflecting member increases and the contrast of the picture projected onto a screen also increases. As a result, the quality of the picture is enhanced. Furthermore, the distance between a light source and the screen is wider because the actuator has the large tilting angle.

12 Claims, 11 Drawing Sheets

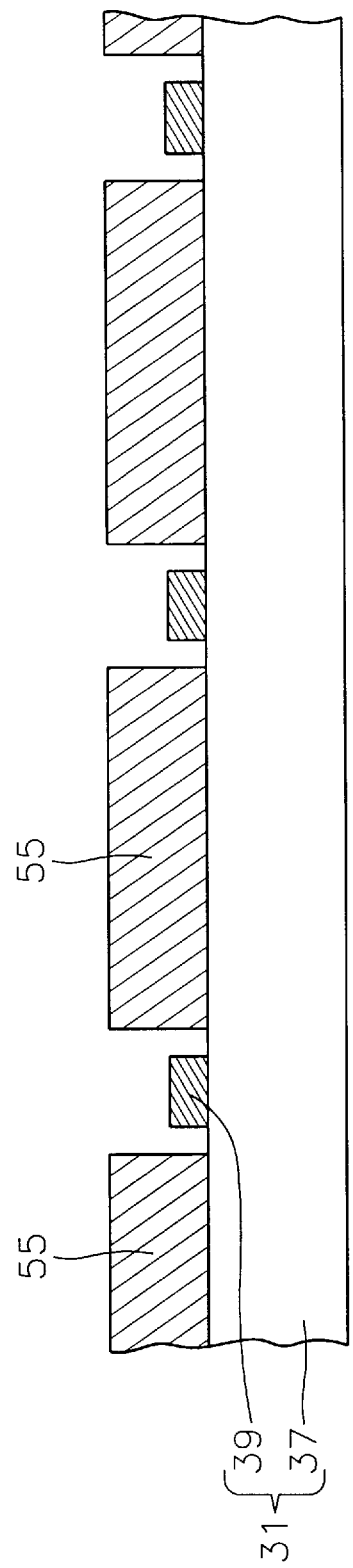

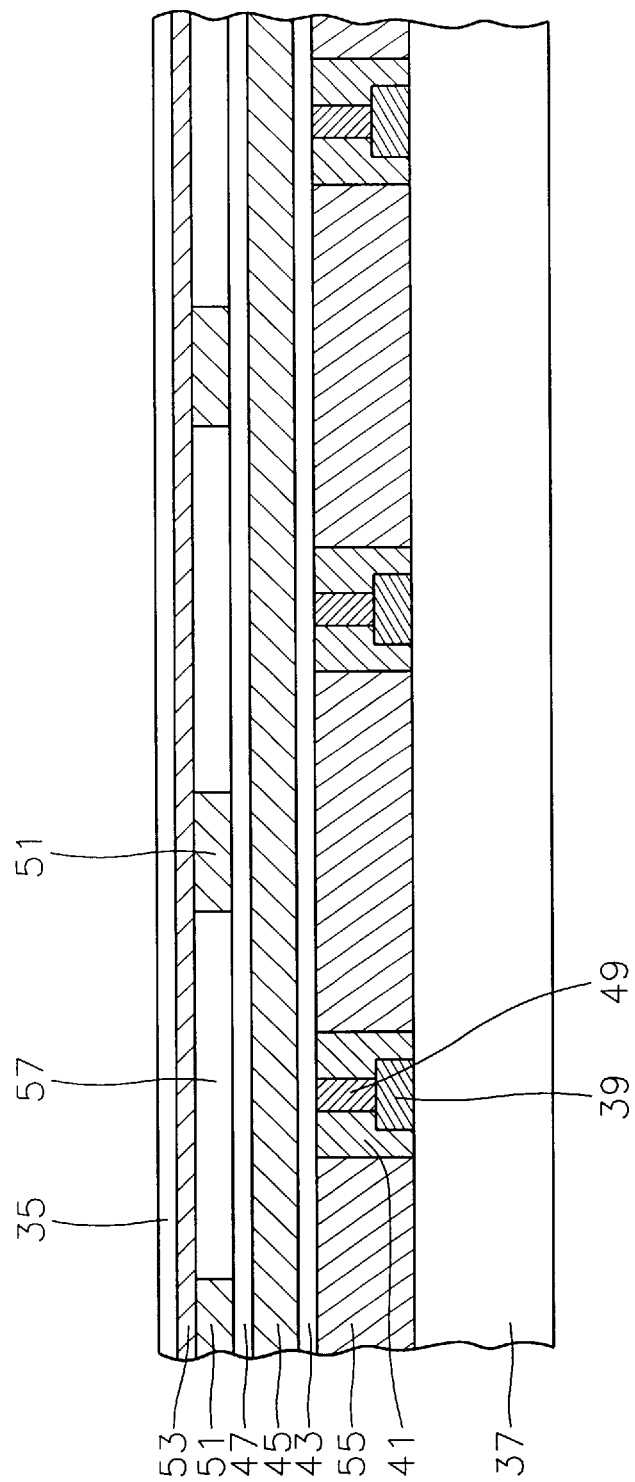

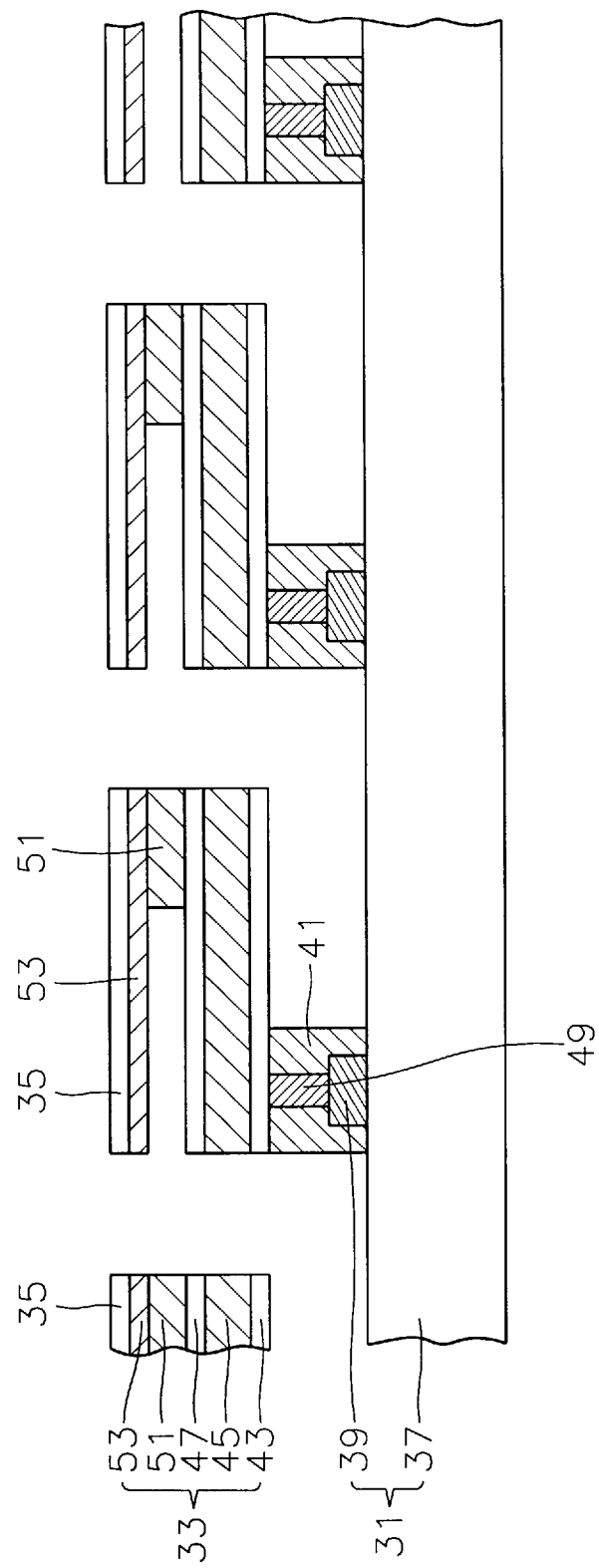

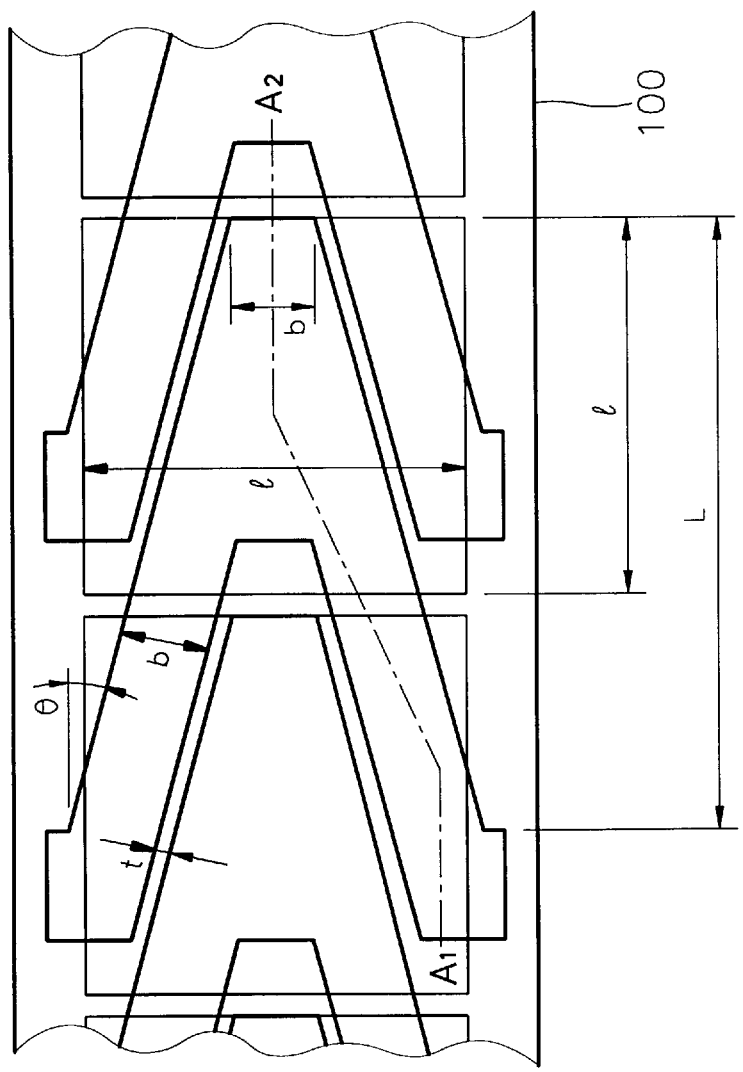

THIN FILM ACTUATED MIRROR ARRAY IN AN OPTICAL PROJECTION SYSTEM

BACKGROUND OF THE INVENTION

The present invention relates to a thin film actuated mirror array in an optical projection system and to a method for manufacturing the same, and more particularly to a thin film actuated mirror array in an optical projection system having an actuator which has a long length in order to be actuated by a large actuating angle, so the quality of the picture projected onto a screen is enhanced, and to a method for manufacturing the same.

In general, light modulators are divided into two groups according to their optics. One type is a direct light modulator such as a cathode ray tube (CRT), the other type is a transmissive light modulator such as a liquid crystal display (LCD). The CRT produce superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2% due to light polarization. Also, there are some problems in the liquid crystal materials of the LCD such as sluggish response and overheating.

Thus, a digital mirror device (DMD) and an actuated mirror array (AMA) have been developed in order to solve these problems. At the present time, the DMD has a light efficiency of about 5% and the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

FIG. 1 shows a schematic diagram of an engine system of a conventional AMA which is disclosed in U.S. Pat. No. 5,126,836 (issued to Gregory Um). Referring to FIG. 1, a ray of incident light from a light source 1 passes a first slit 3 and a first lens 5 and is divided into red, green, and blue lights according to the Red•Green•Blue (R•G•B) system of color representation. After the divided red, green, and blue lights are respectively reflected by a first mirror 7, a second mirror 9, and a third mirror 11, the reflected light is respectively incident on AMA devices 13, 15 and 17 corresponding to the mirrors 7, 9 and, 11. The AMA devices 13, 15 and 17 tilt mirrors installed therein, so the incident light is reflected by mirrors. In this case, mirrors installed in the AMA devices 13, 15 and 17 are tilted according to the deformation of active layers formed under mirrors. The light reflected by the AMA devices 13, 15 and 17 pass a second lens 19 and a second slit 21 and form a picture on a screen (not shown) by using a projection lens 23.

The AMA is generally divided into a bulk type AMA and a thin film type AMA. The bulk type AMA is disclosed in U.S. Pat. No. 5,469,302 (issued to Dae-Young Lim). In the bulk type AMA, after a ceramic wafer which is composed of multilayer ceramics inserted into metal electrodes therein is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film type AMA manufactured by using semiconductor technology has been developed.

The thin film AMA is disclosed at U.S. Ser. No. 08/336, 021, entitled "THIN FILM ACTUATED MIRROR ARRAY USED IN AN OPTICAL PROJECTION SYSTEM AND METHOD FOR THE MANUFACTURE THEREOF", which is now pending in USPTO and is subject to an obligation to the assignee of this application.

FIG. 2 shows a cross sectional view of the thin film AMA. Referring to FIG. 2, the thin film AMA has an active matrix 31, an actuator 33 formed on the active matrix 31, and a mirror 35 installed on the actuator 33. The active matrix 31 has a substrate 37, M×N (M, N are integers) number of transistors (not shown) which are installed in the substrate 37, and M×N (M, N are integers) number of connecting terminals 39 respectively formed on the transistors.

The actuator 33 has a supporting member 41 formed on the active matrix 31 which includes the connecting terminal 39, a first electrode 43 having a bottom of a first portion thereof attached to the supporting member 41 and a second portion formed in parallel to the active matrix 31, a conduit 49 formed in the supporting member 41 so as to connect the connecting terminal 39 to the first electrode 43, an active layer 45 formed on the first electrode 43, a second electrode 47 formed on the active layer 45, a spacing member 51 formed at a first portion of the second electrode 47, and a supporting layer 53 having a bottom of a first portion thereof attached to the spacing member 51 and a second portion formed in parallel to the second electrode 47. The mirror 35 is installed on the supporting layer 53.

A manufacturing method of the thin film AMA will be described below. FIGS. 3A to 3D illustrate manufacturing steps of the thin film AMA. In FIGS. 3A to 3D, the same reference numerals are used for the same elements in FIG. 2.

Referring to FIG. 3A, at first, the active matrix 31 which includes the substrate 37 in which M×N number of transistors (not shown) are formed and M×N number of connecting terminals 39 respectively formed on the transistors is provided. Subsequently, after a first sacrificial layer 55 is formed on the active matrix 31, the first sacrificial layer 55 is patterned to expose a portion of the active matrix 31 where the connecting terminal 39 is formed. The first sacrificial layer 55 can be removed by using etching or chemicals.

Referring to FIG. 3B, the supporting member 41 is formed on the exposed portion of the active matrix 31 by a sputtering method or a chemical vapor deposition (CVD) method. Next, after a hole is formed through supporting member 41, the conduit 49 is formed in the supporting member 41 by filling the hole with an electrically conductive material, for example tungsten (W). The conduit 49 electrically connects the connecting terminal 49 to the first electrode 43 successively formed. The first electrode 43 is formed on the supporting member 41 and on the first sacrificial layer 55 by using an electrically conductive material such as gold (Au) or silver (Ag). The active layer 45 is formed on the first electrode 43 by using a piezoelectric material, for example lead zirconate titanate (PZT). The second electrode 47 is formed on the active layer 45 by using an electrically conductive material such as gold (Au) or silver (Ag).

The transistor installed in the active matrix 31 converts a picture signal which is caused by an incident light from a light source (not shown) into a signal current. The signal current is applied to the first electrode 43 through the connecting terminal 39 and the conduit 49. At the same time, a bias current from a common line (not shown) formed on the bottom of the active matrix 31 is applied to the second electrode 47, so an electric field is generated between the second electrode 47 and the first electrode 43. The active layer 45 formed between the second electrode 47 and the first electrode 43 is actuated according to the electric field.

Referring to FIG. 3C, after a second sacrificial layer 57 is formed on the second electrode 47, the second sacrificial layer 57 is patterned to expose a portion of the second electrode 47 adjacent to a portion under which the supporting member 41 is formed. After the spacing member 51 is formed at the exposed portion, the supporting layer 53 is formed on the second sacrificial layer 57 and on the spacing member 51. Also, the mirror 35 for reflecting the incident light is formed on the supporting layer 53.

Referring to FIG. 3D, the mirror 35, the supporting layer 53, the second electrode 47, the active layer 45 and the first electrode 43 are patterned one after another so that M×N number of pixels having predetermined shapes are formed. Consequently, after the first sacrificial layer 55 and the second sacrificial layer 57 are removed, pixels are rinsed and dried in order to complete the thin film AMA.

However, in the above-described thin film AMA, the tilting angle of the actuator installed therein is small because the actuator has a short length. Hence, the light efficiency of the light reflected by the mirror installed on the actuator is decreased and the contrast of the picture projected onto a screen also is decreased. As a result, the quality of the picture projected onto the screen is poor. In addition, the distance between the light source and the screen is narrower due to the limited tilting angle of the actuator.

SUMMARY OF THE INVENTION

Accordingly, considering the problems as described above, it is a first object of the present invention to provide a thin film actuated mirror array in an optical projection system having an actuator which has a sufficiently long length and is actuated by a large tilting angle so as to increase the tilting angle of a reflecting member installed on the actuator even though the thin film actuated mirror array has a small volume.

Also, it is a second object of the present invention to provide a method for manufacturing the above thin film actuated mirror array in an optical projection system.

To accomplish the above first object, there is provided in the present invention a thin film actuated mirror array in an optical projection system being actuated by a first signal and a second signal. The thin film actuated mirror array comprises a substrate, a supporting element formed on the substrate, an actuator formed on the supporting element, and a reflecting member installed on the actuator.

The substrate has an electrical wiring and a connecting terminal for receiving the first signal from outside and for transmitting the first signal. The supporting element comprises a supporting member formed on a portion of the substrate where the connecting terminal is formed and a supporting layer having a bottom of a first portion attached to the supporting member and a second portion formed above the substrate. The actuator has an A shape and comprises a bottom electrode formed on the supporting layer for receiving the first signal, a top electrode corresponding to the bottom electrode for receiving the second signal and generating an electric field between the top electrode and the bottom electrode, and an active layer formed between the top electrode and the bottom electrode and deformed by the electric field. The reflecting member is formed on the top electrode for reflecting a light.

Preferably, the top electrode, the active layer, the bottom electrode, and the supporting layer respectively have A shapes. The active layer has an area which is wider than the top electrode, the bottom electrode has an area which is wider than the active layer, and the supporting layer has an area which is wider than the bottom electrode.

The actuator further has a via contact for transmitting the first signal from the connecting terminal to the bottom electrode. The via contact is formed in a via hole which is formed from a portion of the active layer to the connecting terminal.

The supporting element is composed of a rigid material, the bottom electrode is composed of an electrically conductive metal, the active layer is composed of a piezoelectric material or an electrostrictive material, and the top electrode is composed of an electrically conductive metal.

Preferably, the bottom electrode is composed of platinum, tantalum, or platinum-tantalum, the active layer is composed of $Pb(Zr, Ti)O_3$, $(Pb, La)(Zr, Ti)O_3$, or $Pb(Mn, Nb)O_3$, and the top electrode is composed of aluminum, platinum, or silver.

The actuator comprises a post formed between a portion of the top electrode and the reflecting member, and the reflecting member has a rectangular shape. The reflecting member has a half length compared to a length of the actuator.

In order to accomplish the above second object, there is provided in the present invention a method for manufacturing a thin film actuated mirror array in an optical projection system being actuated by a first signal and a second signal. The method for manufacturing the thin film actuated mirror array in an optical projection system comprises the steps of:

providing a substrate having an electrical wiring and a connecting terminal for receiving the first signal from outside and transmitting the first signal;

forming a first sacrificial layer on the substrate and patterning the first sacrificial layer to expose a portion of the substrate where the connecting terminal is formed;

forming a first layer on the exposed portion of the substrate and on the first sacrificial layer;

forming a bottom electrode layer, a second layer, and a top electrode layer on the first layer;

forming an actuator by patterning the top electrode layer to form a top electrode for receiving the second signal and generating an electric field, the top electrode having an A shape, by patterning the second layer to form an active layer deformed by the electric field, the active layer having an A shape which is wider than the top electrode, and by patterning the bottom electrode layer to form a bottom electrode for receiving the first signal, the bottom electrode having an A shape which is wider than the active layer;

forming a supporting element for supporting the actuator by patterning the first layer; and forming a reflecting member for reflecting a light on the actuator.

The step of forming the first layer is performed by a low pressure chemical vapor deposition, the step of forming the bottom electrode layer is performed by a chemical vapor deposition method so that the bottom electrode has a thickness of between about 0.1 $\mu$m and about 1.0 $\mu$m, the step of forming the second layer is performed by a sol-gel method so that the second layer has a thickness of between about 0.1 $\mu$m and about 1.0 $\mu$m, and the step of forming the top electrode layer is performed by a chemical vapor deposition method so that the top electrode layer has a thickness of between about 0.1 $\mu$m and about 1.0 $\mu$m.

Also, the step of forming the bottom electrode layer is performed by a sputtering method, the step of forming the second layer is performed by a chemical vapor deposition method or a sputtering method, and the step of forming the top electrode layer is performed by a sputtering method.

The step of forming the actuator further comprises the steps of:

forming a via hole from a portion of the active layer to the connecting terminal through the active layer, the bottom electrode, and the supporting element; and forming a via contact for connecting the connecting terminal to the bottom electrode in the via hole.

The step of forming the via contact is performed by using platinum, tantalum, tungsten, or platinum-tantalum and by a chemical vapor deposition method.

The step of forming the supporting element further comprises the steps of:

forming a supporting member on the exposed portion of the substrate; and forming a supporting layer having a bottom of a first portion attached to the supporting member and a second portion formed above the substrate. The supporting layer has an A shape which is wider than the bottom electrode.

The step of forming the reflecting member is performed after removing the first sacrificial layer, forming a second sacrificial layer on the actuator by using a material having a fluidity and by a spin coating method, and removing a portion of the second sacrificial layer to expose a portion of the top electrode. Also, the step of forming the reflecting member is performed by using a reflective metal and by a sputtering method or a chemical vapor deposition method.

In the thin film AMA according to the present invention, the first signal, that is a picture signal, is applied to the bottom electrode from outside via the electrical wiring, the connecting terminal, and the via contact. Simultaneously, the second signal, that is a bias signal, is applied to the top electrode from outside through the common line. Hence, an electric field is generated between the top electrode and the bottom electrode. The active layer formed between the top electrode and the bottom electrode is deformed by the electric field. The active layer is deformed in a direction perpendicular to the electric field. So, the active layer is actuated in an opponent direction to the position where the supporting layer is positioned. When the tilting angle of the active layer is θ, the actuator having the active layer is actuated upward by a tilting angle of θ. The reflecting member for reflecting an incident light from a light source tilts by an angle of θ because the reflecting member is formed on the actuator. In this case, the tilting angle of the actuator becomes larger according as a length of the actuator becomes longer.

Therefore, in the thin film AMA in an optical projection system according to the present invention, the actuator has a maximum length in order to have a large actuating angle, so the reflecting member tilts by a large tilting angle. In this case, the reflecting member have a half length compared to the length of the actuator in order to have a maximum reflecting area and not to disturb the actuating of the actuator. Hence, the tilting angle of the reflecting member installed on the actuator is much bigger than that of the conventional thin film AMA, even though the thin film AMA has a small volume. Hence, the light efficiency of the light reflected by the reflecting member increases and the contrast of the picture projected onto a screen also increases. As a result, the quality of the picture is much enhanced. Furthermore, the distance between the light source and the screen is wider because the actuator has a large tilting angle.

BRIEF DESCRIPTION OF THE DRAWINGS

The above objects and advantages of the present invention will become more apparent by describing in detail preferred embodiment thereof with reference to the attached drawings, in which:

FIGS. 3A to 3D illustrate manufacturing steps of the thin film AMA illustrated in FIG. 2;

FIG. 4 is a plan view for showing a thin film AMA in an optical projection system according to the present invention;

DETAILED DESCRIPTION OF THE INVENTION

Hereinafter, the preferred embodiment of the present invention will be explained in more detail with reference to the accompanying drawings.

Figure 1:
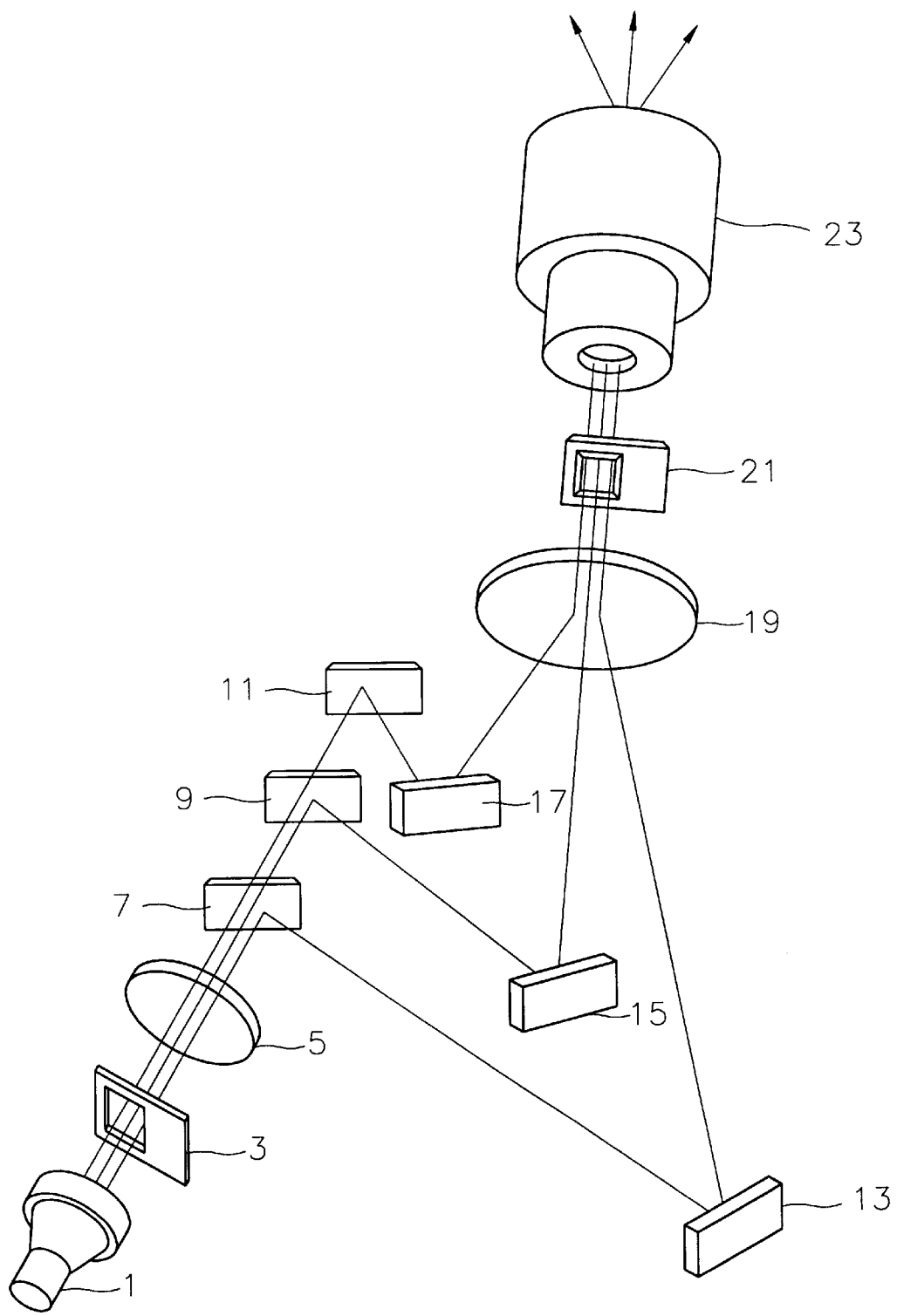
FIG. 1 is a schematic view for showing an engine system of a conventional AMA.
Figure 2:
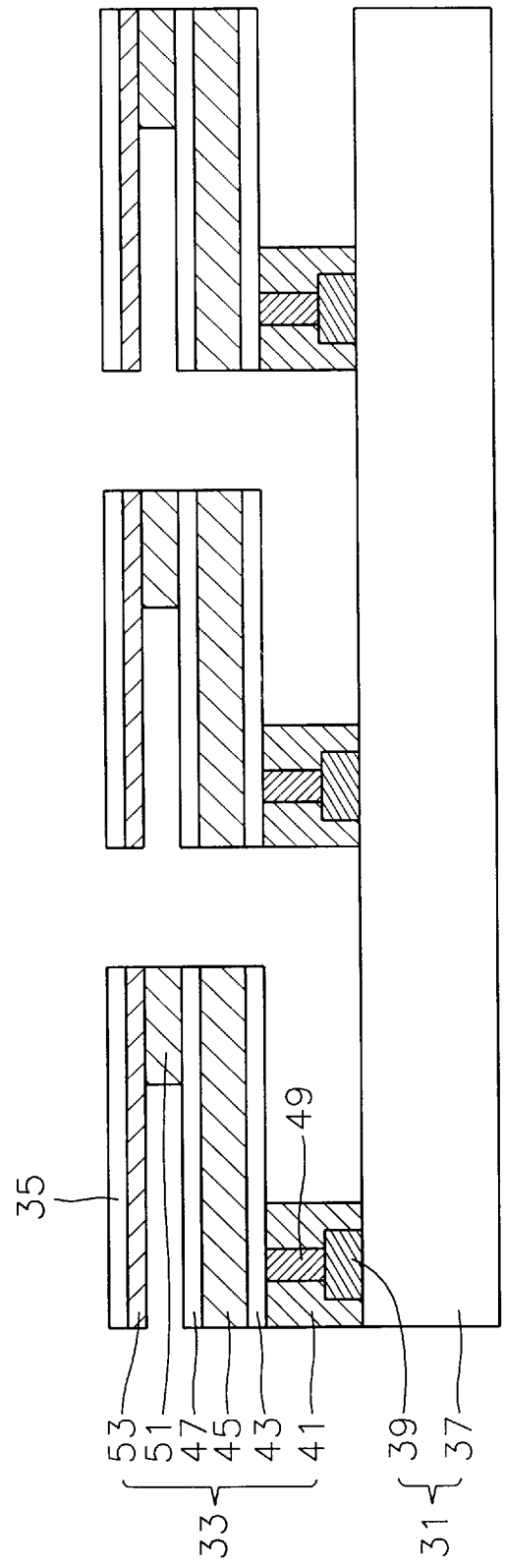
FIG. 2 is a cross sectional view for showing a thin film AMA disclosed in a prior application of the assignee of this application.
Figure 3B:
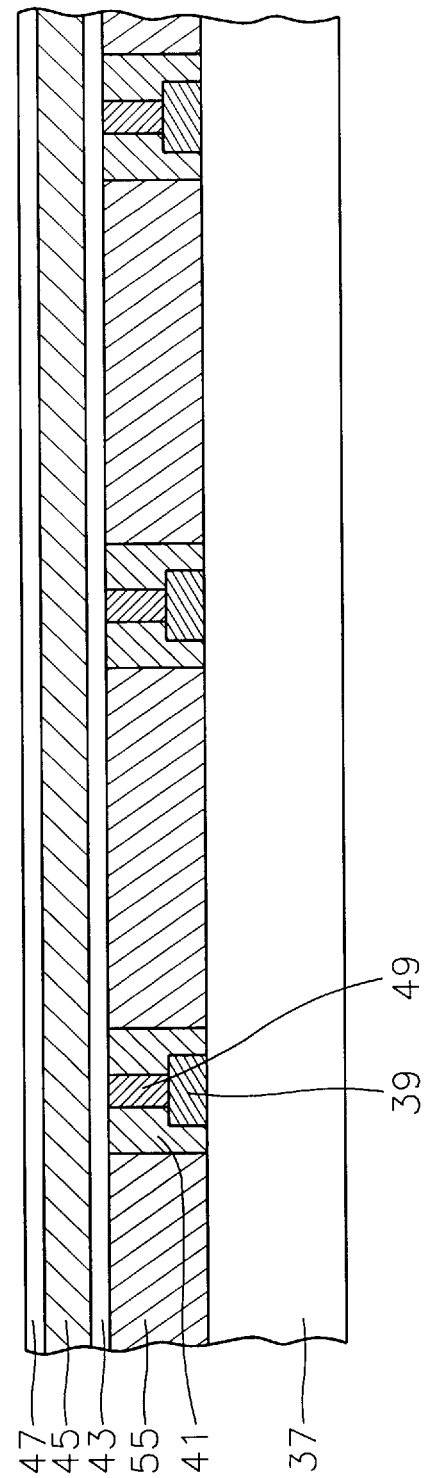
Figure 5:
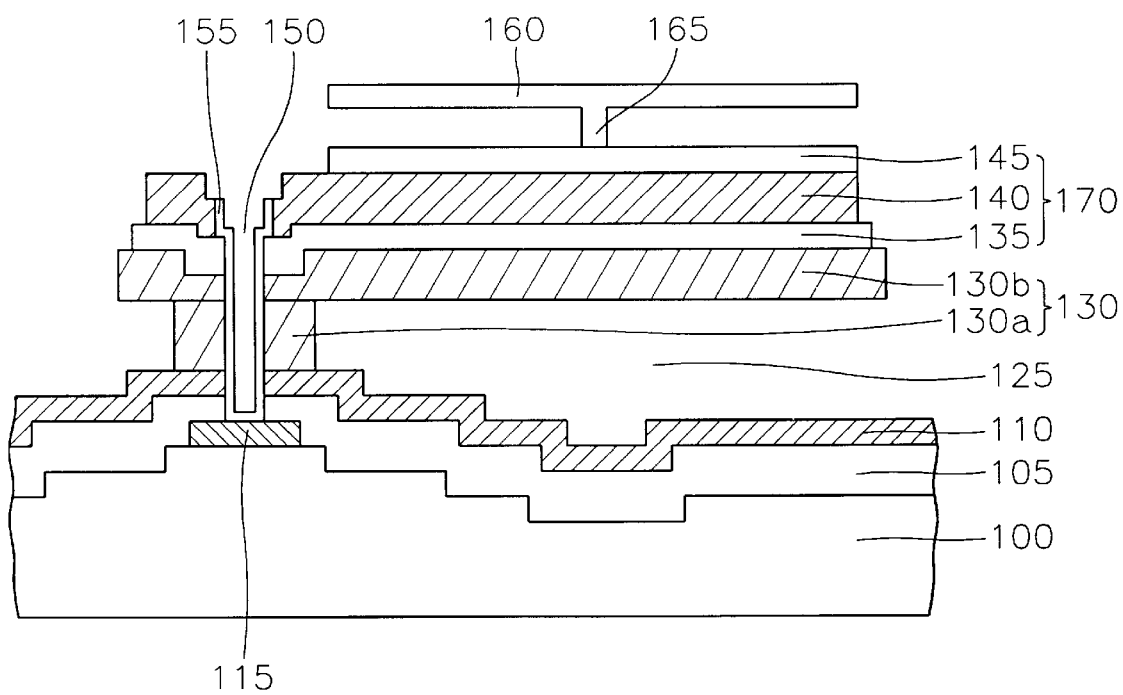
FIG. 5 is a cross sectional view taken along line $A_1$–$A_2$ of FIG. 4.

FIG. 4 is a plan view for showing a thin film AMA in an optical projection system according to the present invention and FIG. 5 is a cross sectional view taken along line $A_1$–$A_2$ of FIG. 4.

Referring to FIG. 4 and FIG. 5, the thin film AMA in an optical projection system according to the present invention has a substrate 100, a supporting element 130 formed on the substrate 100, an actuator 170 formed on the supporting element 130, and a reflecting member 160 installed on the actuator 170.

Referring to FIG. 5, the substrate 100 has an electrical wiring (not shown), a connecting terminal 115 formed on the electrical wiring, a passivation layer 105 overlayed on the substrate 100 and on the connecting terminal 115, and an etching stop layer 110 overlayed on the passivation layer 105. The passivation layer 105 protects the substrate 100 having the electrical wiring and the connecting terminal 115. The electrical wiring and the connecting terminal 115 receive a first signal (picture signal) from outside and transmit the first signal. The etching stop layer 110 prevents the passivation layer 105 and the substrate 100 from etching. Preferably, the electrical wiring has a metal oxide semiconductor (MOS) transistor for switching operation.

The supporting element 130 is formed on the etching stop layer 110. The supporting element 130 has a supporting member 130a and a supporting layer 130b formed on the supporting member 130a. The supporting member 130a is formed on a portion of the etching stop layer 110 where the connecting terminal 115 is formed thereunder. The supporting layer 130b has a bottom of a first portion attached to the supporting member 130a and a second portion parallely formed above the etching stop layer 110. An air gap 125 is interposed between the second portion of the supporting layer 130b and the etching stop layer 110.

The actuator 170 is formed on the supporting layer 130b. The actuator 170 has a bottom electrode 135 formed on the supporting layer 130b, an active layer 140 formed on the bottom electrode 135, a top electrode 145 formed on the active layer 140, a via hole 150 formed from a portion of the active layer 140 to the connecting terminal 115 through the active layer 140, the bottom electrode 135, the supporting element 130, the etching stop layer 110, and the passivation layer 105, and a via contact 155 formed in the via hole 150. The via contact 155 connects the connecting terminal 115 to the bottom electrode 135.

The electrical wiring and the connecting terminal 115 receive the first signal (picture signal) from outside and transmits the first signal to the bottom electrode 135 through the via contact 155. Simultaneously, when the second signal (bias signal) is applied to the top electrode 145 through a common line (not shown), an electric field is generated between the top electrode 145 and the bottom electrode 135. The active layer 140 formed between the top electrode 145 and the bottom electrode 135 is deformed by the electric field. Hence, the actuator 170 having the active layer 140 is also actuated. Preferably, the actuator 170 has an A shape in order to have a maximum length though the thin film AMA has a limited volume. An actuating portion of the actuator 170 and an actuating angle of the actuator 170 are longer according as the actuator 170 has a longer length. When the actuator 170 has the maximum length, the actuating angle of the actuator 170 has a maximum value. The bottom electrode 135 has an area which is smaller than that of the supporting layer 130b and the active layer 140 has an area smaller than that of the bottom electrode 135. Also, the top electrode 145 has an area smaller than that of the active layer 140.

A post 165 is formed at a portion of the top electrode 145 and the reflecting member 160 is supported by the post 165. The post 165 attached to a bottom of a central portion of the reflecting member 160. Preferably, the reflecting member 160 has a half length compared to the length of the actuator 170. Hence, the actuator 170 is partially covered with the reflecting member 160. Preferably, the reflecting member 160 is a mirror having a rectangular shape.

A method for manufacturing the thin film AMA in an optical projection system according to the present invention will be described as follows.

FIGS. 6A to 6D illustrate manufacturing steps of the thin film AMA according to the present invention.

Figure 6A:
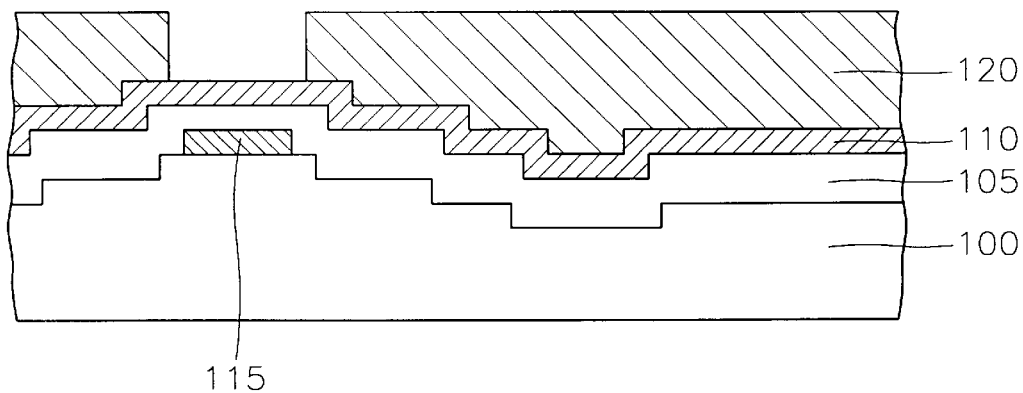
FIGS. 6A to 6D illustrate manufacturing steps of the thin film AMA according to the present invention.

Referring to FIG. 6A, the connecting terminal 115 corresponding to the electrical wiring (not shown) is formed on the substrate 100. Preferably, the substrate 100 is composed of a semiconductor such as silicon (Si) and the electrical wiring has the metal oxide semiconductor transistor for switching operation. The connecting terminal 115 is formed by using a metal, for example tungsten (W). The electrical wiring and the connecting terminal 115 receive the first signal from outside and transmit the first signal to the bottom electrode 135.

The passivation layer 105 is formed on the connecting terminal 115 and on the substrate 100 by using phosphorsilicate glass (PSG). The passivation layer 105 is formed by a chemical vapor deposition (CVD) method so that the passivation layer 105 has a thickness of between about 1.0 μm and about 2.0 μm. The passivation layer 105 protects the substrate 100 having the electrical wiring and the connecting terminal 115 during subsequent manufacturing steps.

The etching stop layer 110 is formed on the passivation layer 105 by using a nitride so that the etch stop layer 110 has a thickness of between about 1000 Å and about 2000 Å. The etching stop layer 110 is formed by a low pressure chemical vapor deposition (LPCVD) method. The etching stop layer 110 protects the passivation layer 105 and the substrate 100 having the electrical wiring and the connecting terminal 115 during successive etching steps.

A first sacrificial layer 120 is formed on the etching stop layer 110. The first sacrificial layer 120 is formed by using PSG and by an atmospheric pressure CVD (APCVD) method so that the first sacrificial layer 120 has a thickness of between about 1.0 μm and about 3.0 μm. In this case, the degree of flatness of the first sacrificial layer 120 is poor because the first sacrificial layer 120 is formed above the substrate 100 having the electrical wiring and the connecting terminal 115. Therefore, the surface of the first sacrificial layer 120 is planarized by using spin-on-glass (SOG) or by a chemical mechanical polishing (CMP) method. Preferably, the surface of the first sacrificial layer 120 is planarized by the CMP method. Subsequently, a portion of the first sacrificial layer 120 where the connecting terminal 115 is formed thereunder, is patterned in order to expose a portion of the etching stop layer 110 where the connecting terminal 115 is formed thereunder.

Figure 6B:
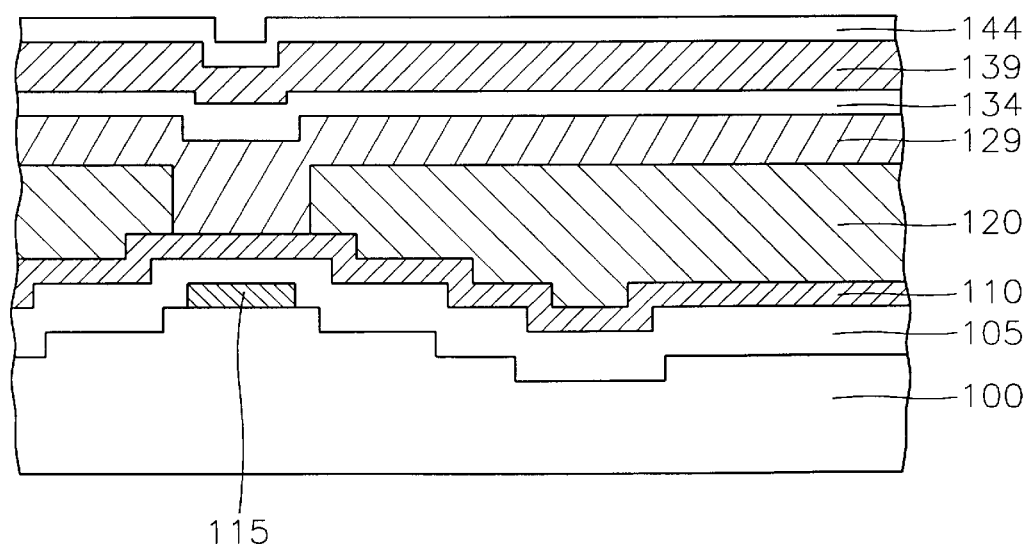

Referring to FIG. 6B, a first layer 129 is formed on the exposed portion of the etching stop layer 110 and on the first sacrificial layer 120 by using a rigid material, for example a nitride or a metal. The first layer 129 is formed by a LPCVD method so that the first layer 129 has a thickness of between about 0.1 μm and about 1.0 μm. The first layer 129 will be patterned so as to form the supporting element 130 which has the supporting member 130a and the supporting layer 130b. The supporting member 130a and the supporting layer 130b together support the actuator 170.

A bottom electrode layer 134 is formed on the first layer 129. The bottom electrode layer 134 is formed by using an electrically conductive metal such as platinum (Pt), tantalum (Ta), or platinum-tantalum (Pt-Ta). The bottom electrode layer 134 is formed by a sputtering method or a CVD method so that the bottom electrode layer 134 has a thickness of between about 0.1 μm and about 1.0 μm. The bottom electrode layer 134 will be patterned so as to form the bottom electrode 140 which receives the first signal from the electrical wiring through the connecting terminal 115 and the via contact 155.

A second layer 139 is formed on the bottom electrode layer 134. The second layer 139 is formed by using a piezoelectric material such as ZnO, PZT (Pb(Zr, Ti)O$_3$), or PLZT ((Pb, La)(Zr, Ti)O$_3$) so that the second layer 139 has a thickness of between about 0.1 μm and about 1.0 μm. Also, the second layer 139 is formed by using an electrostrictive material such as PMN (Pb(Mg, Nb)O$_3$). The second layer 139 is formed by a sol-gel method, a sputtering method, or a CVD method. Preferably, the second layer 139 is formed by using PZT and by the sol-gel method so that the second layer 139 has a thickness of about 0.4 μm. Then, the second layer 139 is annealed by a rapid thermal annealing (RTA) method. The second layer 139 will be patterned so as to form the active layer 140 which deforms by the (electric field generated between the top electrode 145 and the bottom electrode 135.

A top electrode layer 144 is formed on the second layer 139. The top electrode layer 144 is formed by using an electrically conductive metal, for example aluminum (Al), platinum, or tantalum. The top electrode layer 144 is formed by a sputtering method or a CVD method so that the top electrode layer 144 has a thickness of between about 0.1 μm and about 1.0 μm. The top electrode layer 144 will be patterned so as to form the top electrode 145 which receives the second signal from outside through the common line (not shown) and generates the electric field.

Figure 6C:
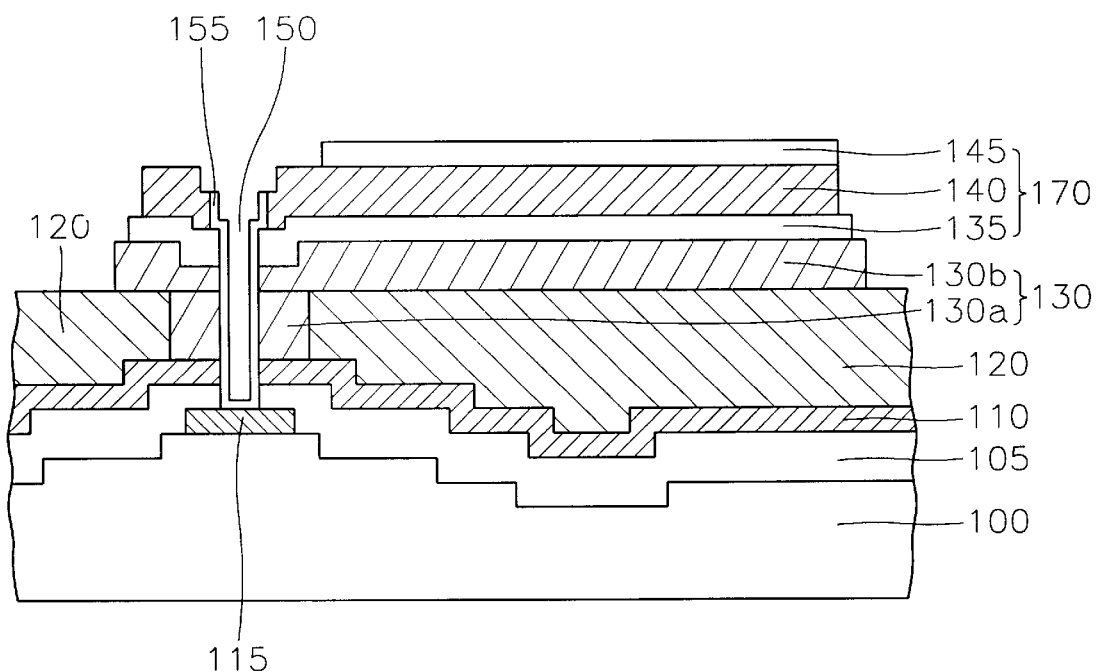

Referring to FIG. 6C, after a first photoresist (not shown) is coated on the top electrode layer 144 by a spin coating method, the top electrode layer 144 is patterned in order to form the top electrode 145 having an A shape by using the first photoresist as an etching mask. Then, the first photoresist is removed by etching. The second layer 139 is patterned by the same method of the top electrode layer 144. That is, a second photoresist (not shown) is coated on the top electrode 145 and on the second layer 139 by a spin coating method, the second layer 139 is patterned in order to form the active layer 140 having an A shape by using the second photoresist as an etching mask. In this case, the active layer 140 has the area wider than that of the top electrode 145. Then, the second photoresist is removed by etching. The bottom electrode layer 134 is patterned by the same method of the top electrode layer 144. Namely, a third photoresist (not shown) is coated on the top electrode 145, on the active layer 140, and on the bottom electrode layer 134 by a spin coating method, the bottom electrode layer 134 is patterned in order to form the bottom electrode 135 having an A shape by using the third photoresist as an etching mask. The bottom electrode 135 has the area wider than that of the active layer 140. When the third photoresist is patterned in order to pattern the bottom electrode layer 134, the portion of the active layer 140 where the connecting terminal 115 is formed thereunder is exposed in order to form the via hole 150. Subsequently, the via hole 150 is formed from the portion of the active layer 140 to the connecting terminal 115 through the bottom electrode 135, the first layer 129, the etch stop layer 110, and the passivation layer 105. The via contact 155 is formed in the via hole 150 by using platinum, tantalum, or tungsten and by a sputtering method or a CVD method. The via contact 155 connects the connecting terminal 115 to the bottom electrode 135. Hence, the first signal is applied to the bottom electrode 135 from outside through the electrical wiring, the connecting terminal 115, and the via contact 155. Then, the third photoresist is removed by etching.

The first layer 129 is patterned in order to form the supporting element 130 by the same method of the top electrode layer 144. The supporting element 130 has the supporting member 130a and the supporting layer 130b. The supporting layer 130b has an A shape which is wider than that of the bottom electrode 135 and the supporting member 130a is attached to the bottom of the first portion of the supporting layer 130b. The second portion of the supporting layer 130b is formed on the first sacrificial layer 120. The second portion of the supporting layer 130b is located above the etching stop layer 110 when the first sacrificial layer 120 is removed by using a vapor of hydrogen fluoride (HF).

Figure 6D:
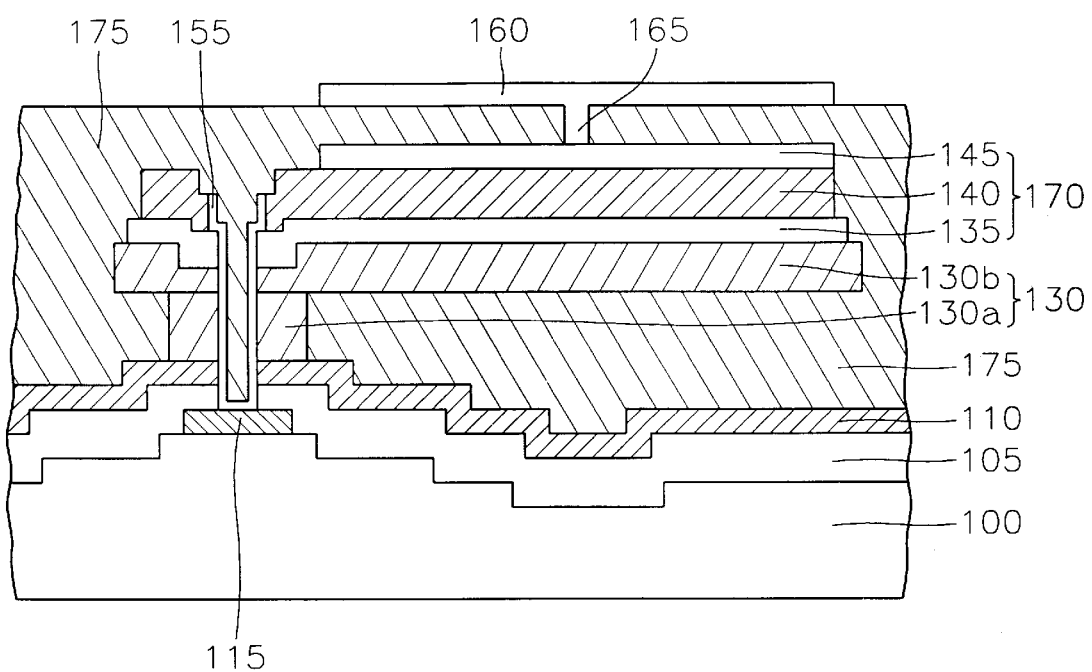

Referring to FIG. 6D, after the first sacrificial layer 120 is removed by using the vapor of hydrogen fluoride, a second sacrificial layer 175 is formed on the actuator 170 by using a material having a fluidity such as polymer and by a spin coating method. The second sacrificial layer 175 is formed to cover the top electrode 145. Then, a portion of the second sacrificial layer 175 is removed so as to expose a portion of the top electrode 145. A reflective metal such as aluminum, platinum, or silver is coated on the exposed portion of the top electrode 145 and on the second sacrificial layer 175 by a sputtering method or a CVD method. Then, the reflecting member 160 and the post 165 are formed by patterning the coated metal. The reflecting member 160 reflects an incident light from a light source (not shown) by a predetermined angle and the post 165 attached to the bottom of the central portion of the reflecting member 160 supports the reflecting member 160. The reflecting member 160 has a thickness of between about 0.1 $\mu$m and about 1.0 $\mu$m. Preferably, the reflecting member 160 is the mirror having the rectangular shape and the length of the reflecting member 160 is a half the length of the actuator 170. When the second sacrificial layer 175 is removed by etching, the actuator 170 and the reflecting member 160 are completed as shown in FIGS. 4 and 5. As it is described above, the flatness of the reflecting member 160 is enhanced because the reflecting member 160 is formed on the second sacrificial layer 175 composed of the material having the fluidity.

The operation of the thin film AMA in an optical projection system according to the present invention will be described.

In the thin film AMA according to the present invention, the first signal, that is the picture signal, is applied to the bottom electrode 135 from outside via the electrical wiring, the connecting terminal 115, and the via contact 115. Simultaneously, the second signal, that is the bias signal, is applied to the top electrode 145 from outside through the common line. Hence, the electric field is generated between the top electrode 145 and the bottom electrode 135. The active layer 140 formed between the top electrode 145 and the bottom electrode 135 is deformed by the electric field. The active layer 140 is deformed in a direction perpendicular to the electric field. So, the active layer 140 is actuated in an opponent direction to the position where the supporting layer 130b is positioned. If the tilting angle of the active layer 140 is θ, the actuator 170 having the active layer 140 is actuated upward by a tilting angle of θ. The reflecting member 160 for reflecting the incident light from the light source tilts by an angle of θ because the reflecting member 160 is formed on the actuator 170. In this case, the tilting angle of the actuator 170 becomes larger according as the length of the actuator 170 becomes longer. As shown in FIG. 4, the maximum length of the actuator 170 is determined as follows.

Referring to FIG. 4, when a width and a length of a pixel are respectively l, a minimum width of the actuator 170 is b, an interval between adjacent actuators is t, an angle of the actuator 170 with a horizontal surface is θ, and the maximum length of the actuator 170 is L, the relative equations are as follows.

$$l = 2 \times L \times (\sin\theta) + b + t$$

$$l \sin\theta = b + t$$

In the above equations, when sinθ is respectively removed, the maximum length of the actuator 170 is determined by the following equation.

$$L = \frac{(l - b - t) \times l}{2 \times (b + t)}$$

For example, if l is equal to 50 $\mu$m and b+t is equal to 10 $\mu$m, L is determined as the following equation.

$$L = \frac{(50 - 10) \times 50}{2 \times 10} = 100 \, \mu m$$

Therefore, in the thin film AMA in an optical projection system according to the present invention, the actuator has the maximum length in order to have a large actuating angle, so the reflecting member tilts by a large tilting angle. In this case, the reflecting member have the half length of the actuator in order to have a maximum reflecting area and not to disturb the actuating of the actuator. Hence, the tilting angle of reflecting member installed on the actuator is much bigger than that of the conventional thin film AMA, even though the thin film AMA has a small volume. Hence, the light efficiency of the light reflected by the reflecting member increases and the contrast of the picture projected onto a screen also increases. As a result, the quality of the picture is much enhanced. Furthermore, the distance between the light source and the screen is wider because the actuator has the large tilting angle.

Although preferred embodiment of the present invention has been described, it is understood that the present invention should not be limited to this preferred embodiment, but various changes and modifications can be made by one skilled in the art within the spirit and scope of the invention as hereinafter claimed.

What is claimed is:

1. A thin film actuated mirror array in an optical projection system being actuated by a first signal and a second signal, said thin film actuated mirror array in an optical projection system comprising:

a substrate having an electrical wiring and a connecting terminal for receiving the first signal from outside and for transmitting the first signal;

a supporting element comprising a supporting member formed on a portion of said substrate where said connecting terminal is formed and a supporting layer having a bottom of a first portion attached to said supporting member and a second portion formed above said substrate;

an actuator which has an A shape comprising i) a bottom electrode for receiving the first signal, said bottom electrode being formed on said supporting layer, ii) a top electrode corresponding to said bottom electrode for receiving the second signal and generating an electric field between said top electrode and said bottom electrode, and iii) an active layer formed between said top electrode and said bottom electrode and deformed by the electric field; and a reflecting means for reflecting a light, said reflecting means being formed on said actuator.

2. The thin film actuated mirror array in an optical projection system as claimed in claim 1, wherein said top electrode, said active layer, said bottom electrode, and said supporting layer respectively have A shapes.

3. The thin film actuated mirror array in an optical projection system as claimed in claim 2, wherein said active layer has an area which is wider than said top electrode, said bottom electrode has an area which is wider than said active layer, and said supporting layer has an area which is wider than said bottom electrode.

4. The thin film actuated mirror array in an optical projection system as claimed in claim 1, said actuator further comprising a via contact for transmitting the first signal from said connecting terminal to said bottom electrode, said via contact being formed in a via hole which is formed from a portion of said active layer to said connecting terminal through said active layer, said bottom electrode, and said supporting element.

5. The thin film actuated mirror array in an optical projection system as claimed in claim 1, wherein said supporting element is composed of a rigid material, said bottom electrode is composed of an electrically conductive metal, said active layer is composed of a piezoelectric material or an electrostrictive material, and said top electrode is composed of an electrically conductive metal.

6. The thin film actuated mirror array in an optical projection system as claimed in claim 5, wherein said bottom electrode is composed of platinum, tantalum, or platinum tantalum, said active layer is composed of $Pb(Zr, Ti)O_3$, $(Pb, La)(Zr, Ti)O_3$, or $Pb(Mn, Nb)O_3$, and said top electrode is composed of aluminum, platinum, or silver.

7. The thin film actuated mirror array in an optical projection system as claimed in claim 1, said actuator further comprising a post formed between a portion of said top electrode and said reflecting means.

8. The thin film actuated mirror array in an optical projection system as claimed in claim 1, wherein said reflecting means has a half length of said actuator and has a rectangular shape.

9. A thin film actuated mirror array in an optical projection system being actuated by a first signal and a second signal, said thin film actuated mirror array in an optical projection system comprising:

a substrate having an electrical wiring and a connection terminal for receiving the first signal from outside and for transmitting the first signal;

a supporting element comprising a supporting member formed on a portion of said substrate where said connecting terminal is formed and a supporting layer having a bottom of a first portion attached to said supporting member and a second portion formed above said substrate, said supporting layer having an A shape;

an actuator comprising i) a bottom electrode for receiving the first signal, said bottom electrode being formed on said supporting layer and having an A shape which is smaller than said supporting layer, ii) a top electrode corresponding to said bottom electrode for receiving the second signal and generating an electric field between said top electrode and said bottom electrode, said top electrode having an A shape which is smaller than said bottom electrode, and iii) an active layer formed between said top electrode and said bottom electrode and deformed by the electric field, said active layer having an A shape which is smaller than said bottom electrode and is larger than said top electrode; and a reflecting means for reflecting light, said reflecting means being formed on said actuator.

10. The thin film actuated mirror array in an optical projection system as claimed in claim 9, said actuator further comprising a via contact for transmitting the first signal from said connecting terminal to said bottom electrode, said via contact being formed in a via hole which is formed from a portion of said active layer to said connecting terminal.

11. The thin film actuated mirror array in an optical projection system as claimed in claim 9, wherein said supporting element is composed of a rigid material, said bottom electrode is composed of an electrically conductive metal, said active layer is composed of a piezoelectric material or an electrostrictive material, and said top electrode is composed of an electrically conductive metal.

12. The thin film actuated mirror array in an optical projection system as claimed in claim 9, said actuator further comprising a post formed between a portion of said top electrode and said reflecting means, and said reflecting means has a rectangular shape having a half length of said actuator.

* * * * *